(12) United States Patent
Prakash et al.

(10) Patent No.: US 9,569,633 B2
(45) Date of Patent: *Feb. 14, 2017

(54) DEVICE, SYSTEM, AND METHOD FOR PROCESSOR-BASED DATA PROTECTION

(75) Inventors: Gyan Prakash, Beaverton, OR (US); Jason M. Fung, Portland, OR (US); Cris Rhodes, Chandler, AZ (US); Selim Aissi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/538,142

(22) Filed: Jun. 29, 2012

(65) Prior Publication Data

US 2014/0006798 A1    Jan. 2, 2014

(51) Int. Cl.
  *G06F 21/72* (2013.01)
  *G06F 21/78* (2013.01)
  *G06F 21/62* (2013.01)

(52) U.S. Cl.
  CPC .......... *G06F 21/6218* (2013.01); *G06F 21/72* (2013.01); *G06F 21/78* (2013.01); *H04L 2209/127* (2013.01)

(58) Field of Classification Search
  CPC ...... G06F 21/6218; G06F 21/72; G06F 21/78; H04L 2209/127
  See application file for complete search history.

(56) References Cited

U.S. PATENT DOCUMENTS

| | | | |
|---|---|---|---|
| 5,757,919 A * | 5/1998 | Herbert et al. | 713/187 |
| 7,171,566 B2 * | 1/2007 | Durrant | 713/189 |
| 7,660,959 B2 * | 2/2010 | Asher et al. | 711/164 |
| 7,908,489 B2 * | 3/2011 | Mimatsu | 713/193 |
| 8,135,962 B2 * | 3/2012 | Strongin et al. | 713/190 |
| 2009/0172414 A1 * | 7/2009 | Dahan | G06F 21/85 713/190 |
| 2010/0162368 A1 * | 6/2010 | Aissi et al. | 726/5 |

(Continued)

FOREIGN PATENT DOCUMENTS

WO    WO 0176129 A2 * 10/2001

OTHER PUBLICATIONS

No stated author; Snapdragon—MSM8X55/APQ8055; 2012; Retrieved from the Internet <URL:.qualcomm.com/media/documents/files/snapdragon-msm8x55-apq8055-product-brief.pdf>; pp. 1-2.*

(Continued)

*Primary Examiner* — Tae Kim
(74) *Attorney, Agent, or Firm* — Barnes & Thornburg LLP (57) ABSTRACT

A device, system, and method for providing processor-based data protection on a mobile computing device includes accessing data stored in memory with a central processing unit of the mobile computing device and determining that the accessed data is encrypted data based on a data included in one or more control registers of the central processing unit. If the data is determined to be encrypted data, the central processing unit is to decrypt the encrypted data using a cryptographic key stored in the central processing unit. The encrypted data may also be stored on a drive of the mobile computing device. The encryption state of the data stored on the drive is maintained in a drive encryption table, which is used to update a memory page tables and the one or more control registers.

23 Claims, 7 Drawing Sheets

(56) References Cited

U.S. PATENT DOCUMENTS

| | | | | |
|---|---|---|---|---|
| 2010/0281273 A1* | 11/2010 | Lee | ............ | G06F 21/72 |
| | | | | 713/190 |
| 2011/0010770 A1* | 1/2011 | Smith | ............ | G06F 21/71 |
| | | | | 726/18 |
| 2011/0076986 A1* | 3/2011 | Glendinning | ............ | G06F 21/88 |
| | | | | 455/411 |
| 2012/0102307 A1* | 4/2012 | Wong | ............ | 713/2 |
| 2013/0019105 A1* | 1/2013 | Hussain | ............ | 713/189 |
| 2013/0061035 A1* | 3/2013 | Hook et al. | ............ | 713/150 |

OTHER PUBLICATIONS

No stated author; ARM—Cortex-A series—V2.0, programmers Guide; 2011; Retrieved from the Internet <URL:csc.lsu.edu/~whaley/teach/FHPO_F11/ARM/CortAProgGuide.pdf>; pp. 1-55 as printed.*

Edmison, Joshua; Hardware Architectures for Software Security; Jun. 2006; Retrieved from the Internet <URL:vtechworks.lib.vt.edu/bitstream/handle/10919/29244/edmison_joshua_dissertation.pdf>; pp. 1-139.*

Suh et al.; AEGIS: Architecture for Tamper-Evident and Tamper-Resistant Processing; 2003; Retrieved from the Internet <URL:dl.acm.org/citation.cfm?id=782838>; pp. 1-12.*

No stated author; x86 architecture control registers; 2015; Retrieved from the Internet <URL: sandpile.org/x86/crx.htm>, pp. 1-5 as printed.*

* cited by examiner

DEVICE, SYSTEM, AND METHOD FOR PROCESSOR-BASED DATA PROTECTION

BACKGROUND

Data security remains a concern across all computer platforms. However, data security is a significant concern on mobile, hand-held computing devices such as smart phones and tablet computers. The mobility and relatively small form factor of such devices, while generally desirable, tends to allow for easier misplacement, loss, and theft of mobile computing devices. When a mobile computing device is lost or stolen, the data stored on the device is in jeopardy. Depending on the previous uses of the mobile computing device, the lost/stolen device may include sensitive data such as personal identification data, financial data, medical data, and/or the like.

Typical desktop computers and other immobile and/or non-hand-held computing devices may implement a form of data protection using a type of software-based data encryption/decryption. For example, some data protection solutions for desktop computers employ a whole disk encryption/decryption scheme. However, such software-based data protection solutions typically rely on the computational power of the central processing unit of the desktop computer, which may be significantly more powerful than those processors included on mobile, hand-held computing devices. Additionally, some desktop and similar computers may include self-encrypting hard disk drives. However, such hard disk drives typically include a form factor that restricts their use in the mobile, hand-held computing devices such as a smart phone or tablet computer.

BRIEF DESCRIPTION OF THE DRAWINGS

The embodiments described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
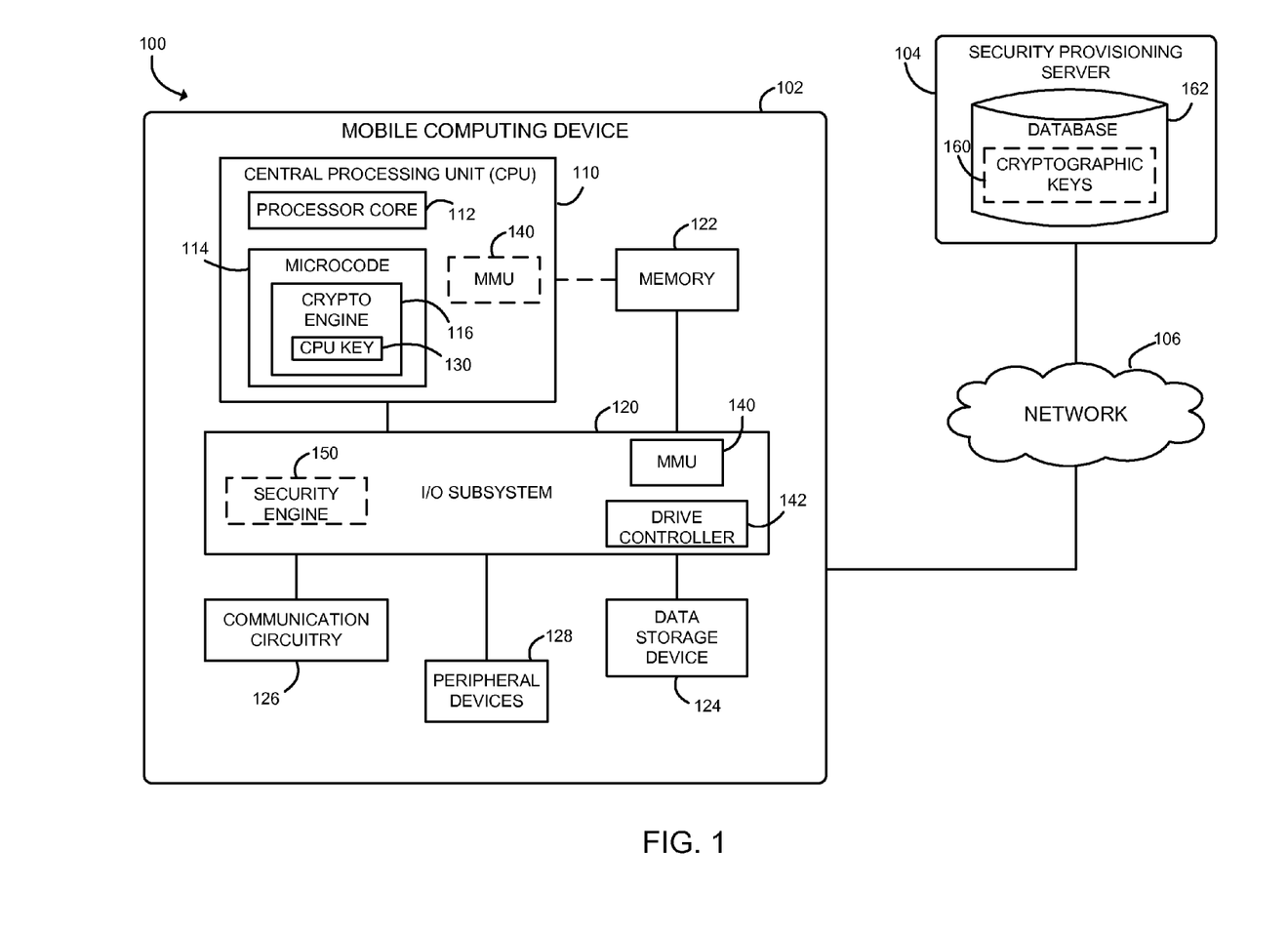
FIG. 1 is a simplified block diagram of at least one embodiment of a system for processor-based data protection on a mobile computing device.

Referring now to FIG. 1, in one embodiment, a system 100 for providing process-based data protection includes a mobile computing device 102 and a security provisioning server 104, which communicate with each other of a network 106. The mobile computing device 102 may be embodied as any type of mobile computing device capable of performing the functions described herein including, but not limited to, a mobile phone, a smart phone, a tablet computing device, a personal digital assistant, a messaging device, a consumer electronic device, a handset, a laptop computer, and/or any other mobile computing device configured to store data locally. In one particular embodiment, the mobile computing device 102 has a form factor sized to be held in a hand of the user, such as a smart phone or tablet computer.

As discussed in more detail below, the mobile computing device 102 is configured to provide processor-based data protection for data stored on the device 102 utilizing a central processing unit 110 that includes a cryptographic engine 116. The cryptographic engine 116 of the central processing unit 110 facilitates encryption/decryption of locally stored data using a cryptographic key securely stored in the central processing unit 110. The central processing unit 110 is capable of determining the encrypted/decrypted state of the locally stored data based on data included in one or more control registers of the central processing unit 110. It should be appreciated that because the cryptographic key remains securely within the central processing unit 110 (i.e., the cryptographic keys of the central processing unit 110 are not exposed to any application executing on, or other device of, the mobile computing device 102), the data protection provided by the central processing unit 110 is improved relative to typical software-based encryption techniques. Additionally, because the cryptographic engine 116 is incorporated within the central processing unit 110, the encryption/decryption of data may be quicker than some software-based encryption techniques.

As shown in FIG. 1, the illustrative mobile computing device 102 includes the central processing unit 110, an I/O subsystem 120, a memory 122, a data storage device 124, a communication circuitry 126, and one or more peripheral devices 128. In some embodiments, several of the foregoing components may be incorporated on a motherboard or main board of the mobile computing device 102, while other components may be communicatively coupled to the motherboard via, for example, a peripheral port. Furthermore, it should be appreciated that the mobile computing device 102 may include other components, sub-components, and devices commonly found in a mobile computing device, which are not illustrated in FIG. 1 for clarity of the description.

The central processing unit 110 may be embodied as any type of processor, microprocessor, microcontroller, digital signal processor, or other processing circuitry including the features and capabilities described herein. The central processing unit 110 is illustratively embodied as a single core processor having a processor core 112. However, in other embodiments, the central processing unit 110 may be embodied as a multi-core processor having multiple processor cores 112. Additionally, in some embodiments, the mobile computing device 102 may include additional processors 110, or other processors, having one or more processor cores.

As discussed above, the central processing unit 110 includes a cryptographic engine 116, which is illustratively embodied in the microcode 114 of the central processing unit 110. The cryptographic engine 116 is capable of encrypting and decrypting data stored on the mobile computing device 102 as discussed in more detail below. Illustratively, the cryptographic engine 116 is configured to encrypt/decrypt data using an Advanced Encryption Standard (AES) symmetric key algorithm in Cipher Block Chaining (CBC) mode. Of course, in other embodiments, the cryptographic engine 116 may utilize other types of encryption algorithms and/or other encryption modes.

The cryptographic engine 116 may maintain and/or generate various cryptographic keys used during the cryptographic functions of the engine 116. For example, in the illustrative embodiment, the cryptographic engine 116 includes a cryptographic processor key 130, which is provisioned in the central processing unit 110 during the manufacturing of the central processing unit 110. In one particular embodiment, the cryptographic processor key 130 is embodied as a one-time-programmable (OTP) fuse that is programmed by a manufacturer of the central processing unit 110. The processor key 130 is maintained within the central processing unit 110 in a secure manner such that the processor key 130 is not exposed or attainable by software or other devices of the mobile computing device 102. As discussed in more detail below, the cryptographic processor key 130 is used by central processing unit 110 to generate a cryptographic symmetric key 134 (see FIG. 2) that is subsequently used to encrypt and decrypt data stored on the mobile computing device 102. Of course, it should be appreciated that although only a single cryptographic processor key 130 is shown in FIG. 1, the central processing unit 110 may include additional processor keys in other embodiments.

The I/O subsystem 120 of the mobile computing device 102 may be embodied as circuitry and/or components to facilitate input/output operations with the central processing unit 110 and/or other components of the mobile computing device 102. In some embodiments, the I/O subsystem 120 may be embodied as a memory controller hub (MCH or "northbridge"), an input/output controller hub (ICH or "southbridge"), and a firmware device. In such embodiments, the I/O subsystem 120 may include a memory management unit 140 configured to manage the memory 122 and interaction therewith including, for example, establishing and maintaining virtual memory pages. In other embodiments, however, I/O subsystems having other configurations may be used. For example, in some embodiments, the I/O subsystem 120 may be embodied as a platform controller hub (PCH). In such embodiments, the memory management unit 140 may be incorporated in or otherwise associated with the central processing unit 110, and the central processing unit 110 may communicate directly with the memory 122 (as shown by the hashed line in FIG. 1). Additionally, in other embodiments, the I/O subsystem 120 may form a portion of a system-on-a-chip (SoC) and be incorporated, along with the central processing unit 110 and other components of the mobile computing device 102, on a single integrated circuit chip.

In some embodiments, the I/O subsystem 120 may also include a security engine 150. The security engine 150 may be embodied as a security co-processor or circuitry configured to perform certain security functions on the mobile computing device 102. For example, as discussed in more detail below, the illustrative security engine 150 is configured to establish a secured communication link with the security provisioning server 104 over the network 106 and provide a secure environment for receiving and responding to communications received from the server 104.

The central processing unit 110 is communicatively coupled to the I/O subsystem 120 via a number of signal paths. These signal paths (and other signal paths illustrated in FIG. 1) may be embodied as any type of signal paths capable of facilitating communication between the components of the mobile computing device 102. For example, the signal paths may be embodied as any number of point-to-point links, wires, cables, light guides, printed circuit board traces, vias, bus, intervening devices, and/or the like.

The memory 122 of the mobile computing device 102 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 122 is communicatively coupled to the I/O subsystem 120 via a number of signal paths (or to the central processing unit 110). Although only a single memory device 122 is illustrated in FIG. 1, the mobile computing device 102 may include additional memory devices in other embodiments. Various data and software may be stored in the memory 122. For example, one or more operating systems, applications, programs, libraries, and drivers that make up the software stack executed by the central processing unit 110 may reside in memory 122 during execution. Additionally, as discussed in more detail below with regard to FIG. 2, data used by one or more applications executed on the mobile computing device 102 may be stored in an encrypted or unencrypted state in the memory 122.

The data storage 124 may be embodied as any type of device or devices configured for the short-term or long-term storage of data. In the illustrative embodiment, the data storage 124 is embodied as, or otherwise includes, a data drive for long-term storage of data, which may be embodied as a hard disk drive, a solid state drive, or other drive device. As shown in FIG. 1, the I/O subsystem 120 may include a drive controller 142, which may be embodied as hardware, software, or a combination thereof, to control the drive 124. Additionally, as discussed in more detail below with regard to FIG. 2, the mobile computing device 102 includes a drive manager module 204 to manage the data stored on the drive 124. In use, the drive manager module 204 monitors the encryption state of data stored on the drive 124 using a drive encryption table 210, which may also be stored on the drive 124 or within the memory 122.

The communication circuitry 126 of the mobile computing device 102 may include any number of devices and circuitry for enabling communications between the mobile computing device 102 and the security provisioning server 104 over the network 106. The communication circuitry 126 may be configured to use any one or more, or combination thereof, communication protocols to communicate with the security provisioning server 104 such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols.

In some embodiments, the mobile computing device 102 may also include one or more peripheral devices 128. Such peripheral devices 128 may include any number of additional input/output devices, interface devices, and/or other peripheral devices. For example, in some embodiments, the peripheral devices 128 may include a display, keyboard, a speaker system, and/or other input/output devices, interface devices, and/or peripheral devices.

The security provisioning server 104 may be embodied as any type of data/web server or similar computing device capable of performing the functions described herein. As such, the security provisioning server 104 may include devices and structures commonly found in such data servers such as processors, memory devices, and data storages, which are not shown in FIG. 1 for clarity of the description. The security provisioning server 104 maintains one or more cryptographic keys 160, which may be stored in a database 162 of the server 104. As discussed in more detail below, the security provisioning server 104 is configured to communicate with the mobile computing device 102 over the network 106 to turn on/off the processor-based data protection of the mobile computing device 102 and provision the mobile computing device 102 with a shared secret key 132 (see FIG. 2). As discussed above, the shared secret key 132 may be used by the cryptographic engine 116 of the central processing unit to generate the cryptographic symmetric key used to encrypt and decrypt data stored locally on the mobile computing device 102.

The network 106 may be embodied as any number of various wired and/or wireless networks. For example, the network 106 may be embodied as, or otherwise include, a wired or wireless local area network (LAN), a wired or wireless wide area network (WAN), and/or a publicly-accessible, global network such as the Internet. As such, the network 106 may include any number of additional devices, such as additional computers, routers, and switches, to facilitate communications between the mobile computing device 102 and the security provisioning server 104.

Figure 2:
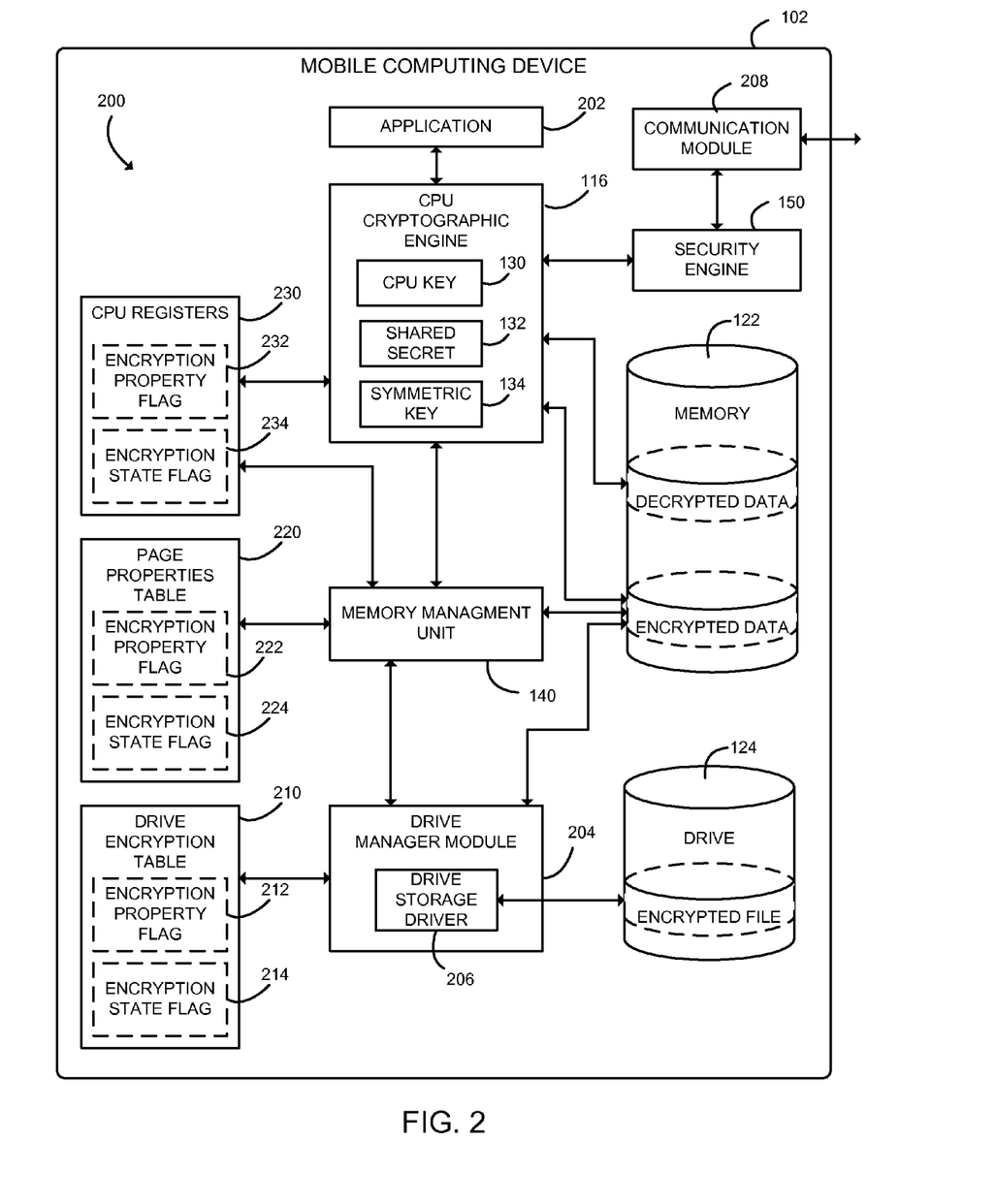
FIG. 2 is a simplified block diagram of at least one embodiment of an environment of the mobile computing device of FIG. 1.

Referring now to FIG. 2, in one embodiment, the mobile computing device 102 may establish an environment 200 during operation. The illustrative environment 200 includes one or more applications 202, the cryptographic engine 116, the memory management unit 140, and the drive manager module 204.

The application(s) 202 may be embodied as any type of software or firmware application that may periodically request access to data stored on the drive 124. As discussed above, the data stored on the drive 124 may be stored in an encrypted or decrypted state. When the application 202 requests access to data stored on the drive 124, the drive manager module 204 retrieves the requested data from the drive 124 and stores the requested data in the memory 122. As discussed above, the drive manager module 204 maintains a drive encryption table 210 that identifies the state of encryption of data stored on the drive. As such, the drive manager module 204 accesses the drive encryption table 210 to determine the state of encryption of the retrieved data.

The drive encryption table 210 may be embodied as any type of database or data file for storing the encryption information. In the illustrative embodiment of FIG. 2, the drive encryption table 210 includes an encryption property flag 212 and an encryption state flag 214 for each data block (or, in some embodiments, each data file) of the drive 124. The encryption property flag 212 indicates whether data encryption has been enabled for the particular data block of the drive 124, the particular data file, or the retrieved data (depending on the particular embodiment). If data has been enabled for the retrieved data, the drive manager module 204 also checks the encryption state flag 214, which indicates whether the retrieved data is stored in an encrypted state or a decrypted state. The drive manager module 204 provides the encryption information (i.e., the encryption property data and the encryption state data) to the memory management unit 140.

The memory management unit 140 maintains a memory page properties table 220 for organizing and managing the memory 122 (e.g., for establishing virtual memory on the mobile computing device 102). Similar to the drive encryption table 210, the memory page properties table 220 may be embodied as any type of data file or the like for maintaining memory-related information. The memory page properties table 220 includes header or metadata including encryption information that identifies the state of encryption of data stored in the memory 122 (i.e., the state of encryption of each memory page of the memory 122). In the illustrative embodiment, the page properties table 220 includes an encryption property flag 222 and an encryption state flag 224 for each memory page of the memory 122. Similar to the encryption property flag 212, the encryption property flag 222 indicates whether data encryption has been enabled for the particular memory page and, similar to the encryption state flag 214, the encryption state flag 224 indicates whether the data stored on the associated memory page is stored in an encrypted state or a decrypted state. After receiving the encryption information from the drive manager module 204, the memory management unit 140 updates the page properties table for the memory page(s) of the memory 122 wherein the retrieved data is stored with the encryption information. For example, if the retrieved data is encrypted, the memory management unit 140 may set the encryption property flag 222 and the encryption state flag 224.

Figure 3:
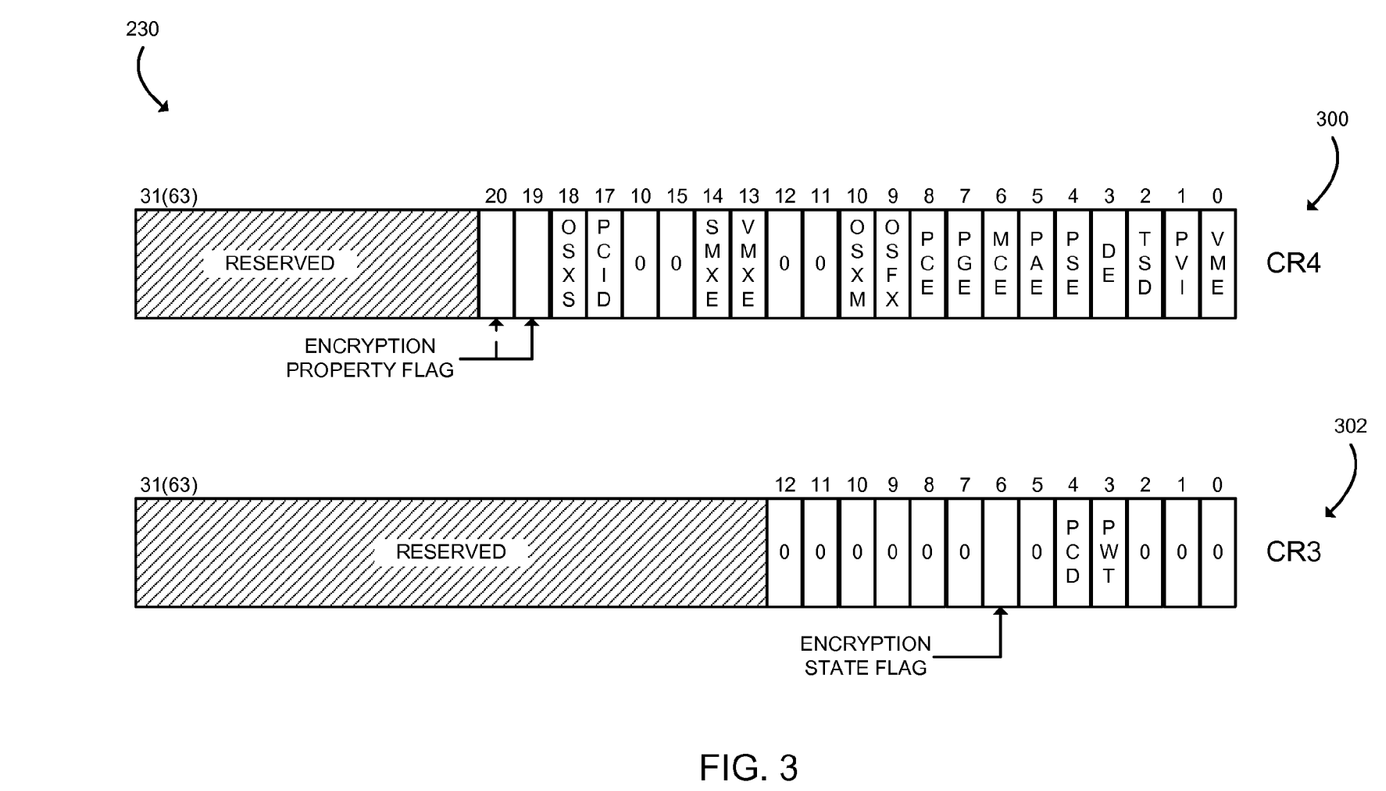
FIG. 3 is a simplified block diagram representation of at least on embodiment of control registers of a central processing unit of the mobile computing device of FIG. 1.

After the page properties table 220 has been updated, the memory management unit 140 notifies the cryptographic engine 116 of the retrieved data stored in the memory 122 (e.g., provides location data of the retrieved data), and the cryptographic engine 116 may access the retrieved data. In response to the cryptographic engine 116 accessing the retrieved data, the memory management unit 140 updates the control registers 230 of the central processing unit 110 to reflect the encryption property of the accessed data. Similar to the drive encryption table 210 and the page properties table 220, the control registers 230 includes encryption information that identifies the state of encryption of the retrieved data. In the illustrative embodiment, the control registers include an encryption property flag 232 that indicates whether data encryption has been enabled for the retrieved data and an encryption state flag 224 that indicates whether the retrieved data is stored in an encrypted or decrypted state in the memory 122. As shown in FIG. 3, the encryption property flag 232 is included in the control register 4 (CR4) 300 and the encryption state flag 234 is included in the control register 3 (CR3) 302. Specifically, the encryption property flag 232 is embodied as bit 19 or 20 of CR4 300, and the encryption state flag 234 is embodied as bit 6 of CR3 302. Of course, other bits of the same or other control registers may be used in other embodiments for the flags 232, 234.

If the cryptographic engine 116 determines that the retrieved data is encrypted, the cryptographic engine 116 decrypts the retrieved data using the cryptographic symmetric key 134 and stores the decrypted data in the memory 122. The cryptographic engine 116 may subsequently remove or delete the encrypted data from the memory 122. After the data has been decrypted by the cryptographic engine 116, the central processing unit 110 notifies the application 202 of the location of the decrypted data in the memory 122.

As discussed above, the cryptographic engine 116 maintains various cryptographic keys including the cryptographic processor key 130 and the cryptographic symmetric key 134, which is used to encrypt and decrypt the data stored in the memory 122. The cryptographic symmetric key 134 is generated by the cryptographic engine 116 using the cryptographic processor key 130 and the shared secret key 132 established with the security provisioning server 104. To establish the shared secret key 132, the security engine 150 establishes a secured communication link with the security providing server 104 using a communication module 208 of the mobile computing device 102. The security engine 150 receives secured communications from the security provisioning server 104, which are passed to the central processing unit 110 and the cryptographic engine 116. The cryptographic engine 116 establishes the shared secret key 132 with the security provisioning server 104 using the cryptographic processor key 130 provisioned in the central processing unit 110 at the time of manufacturing. The cryptographic engine 116 and the security provisioning server 104 may use any suitable algorithm for generating the shared secret key 132 such as, for example, a Diffie-Hellman key exchange.

Figure 4:
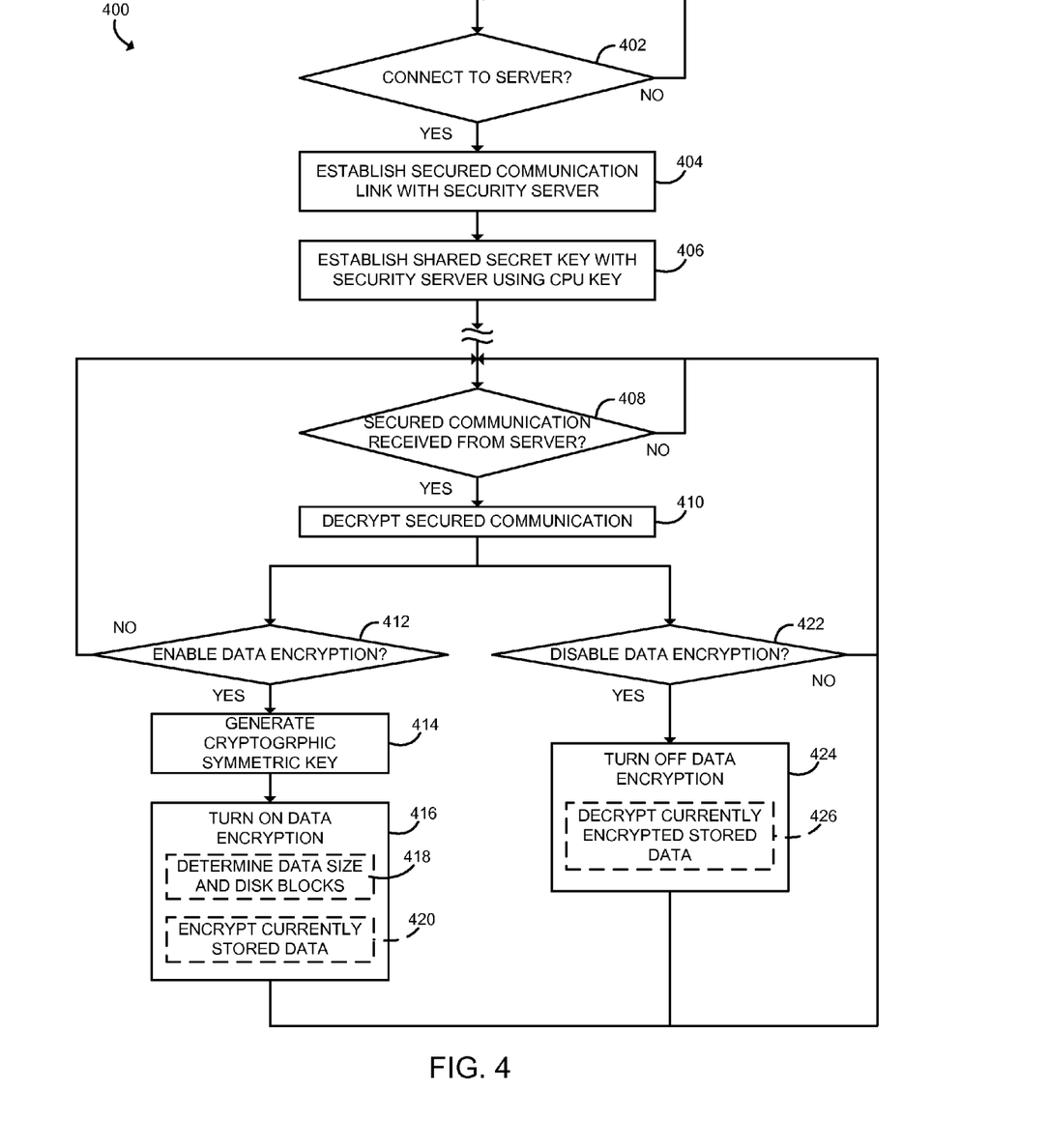
FIG. 4 is a simplified flow diagram of at least one embodiment of a method for provisioning the mobile computing device of FIG. 1.

Referring now to FIG. 4, in use, the mobile computing device 102 may execute a method 400 for provisioning the shared secret key 132. The method 400 begins with block 402 in which the mobile computing device 102 determines whether to connect to the security provisioning server 104. The mobile computing device 102 may be configured to automatically connect to the security provisioning server 104 (e.g., periodically) or to connect to the server 104 in response to a user's command. If the mobile computing device 102 is to connect to the server 104, the method 400 advances to block 404 in which the mobile computing device 102 establishes a secured communication link with the security server 104. In some embodiments, as discussed above, the security engine 150 establishes the secured communication link. In block 406, the shared secret key 132 is established between the mobile computing device 102 and the server 104. To do so, the mobile computing device 102 may use the cryptographic processor key 130 in a key exchange (e.g., a Diffie-Hellman key exchange) with the security provisioning server 104 to establish the shared secret key 132. The shared secret key 132 is stored in the cryptographic engine 116 of the central processing unit 110.

After the shared secret key 132 has been established, the method 400 advances to block 408 in which the mobile computing device 102 monitors for further secured communications from the security provisioning server 104. As discussed below, such further secured communications may include commands to enable/disable the processor-based data protection on the mobile computing device 102. If a secured communication is received from the security provisioning server 104, the secured communication is decrypted in block 410. The secured communication may be decrypted by the security engine 150 or the cryptographic engine 116 using, for example, the shared secret key 132. Alternatively, a separate key pair may be used for the secured communications.

In block 412, the cryptographic engine 116 determines whether the received secured communication enables the processor-based data protection. If so, the method 400 advances to block 414 in which the cryptographic engine 116 generates the cryptographic symmetric key 134, which is subsequently used for encryption/decryption of data as discussed above. In one embodiment, the cryptographic symmetric key 134 is embodied as a session key generated as a function of the shared secret key 132. However, in other embodiments, the cryptographic symmetric key 134 may be embodied as a cryptographic key provisioned in the central processing unit 110 at the time of manufacturing similar to the cryptographic processor key 130.

In block 416, the processor-based data protection is enabled on the mobile computing device 102. In some embodiments, the data size and disk blocks used in the drive encryption table 210 is determined, which are also used to partition the stored data on the drive 124. Additionally, in some embodiments, any data currently stored on the drive 124 is encrypted in block 420 using the cryptographic symmetric key 134 generated in block 414.

Referring back to block 410, if the decrypted secured communication from the security provisioning server 104 is determined to disable the processor-based data protection in block 422, the method 400 advances to block 424. In block 424, the processor-based data protection is disabled on the mobile computing device 102. In some embodiments, any currently encrypted data stored on the drive 124 is decrypted in block 426 using the cryptographic symmetric key 134 stored in the central processing unit 110.

Figure 5:
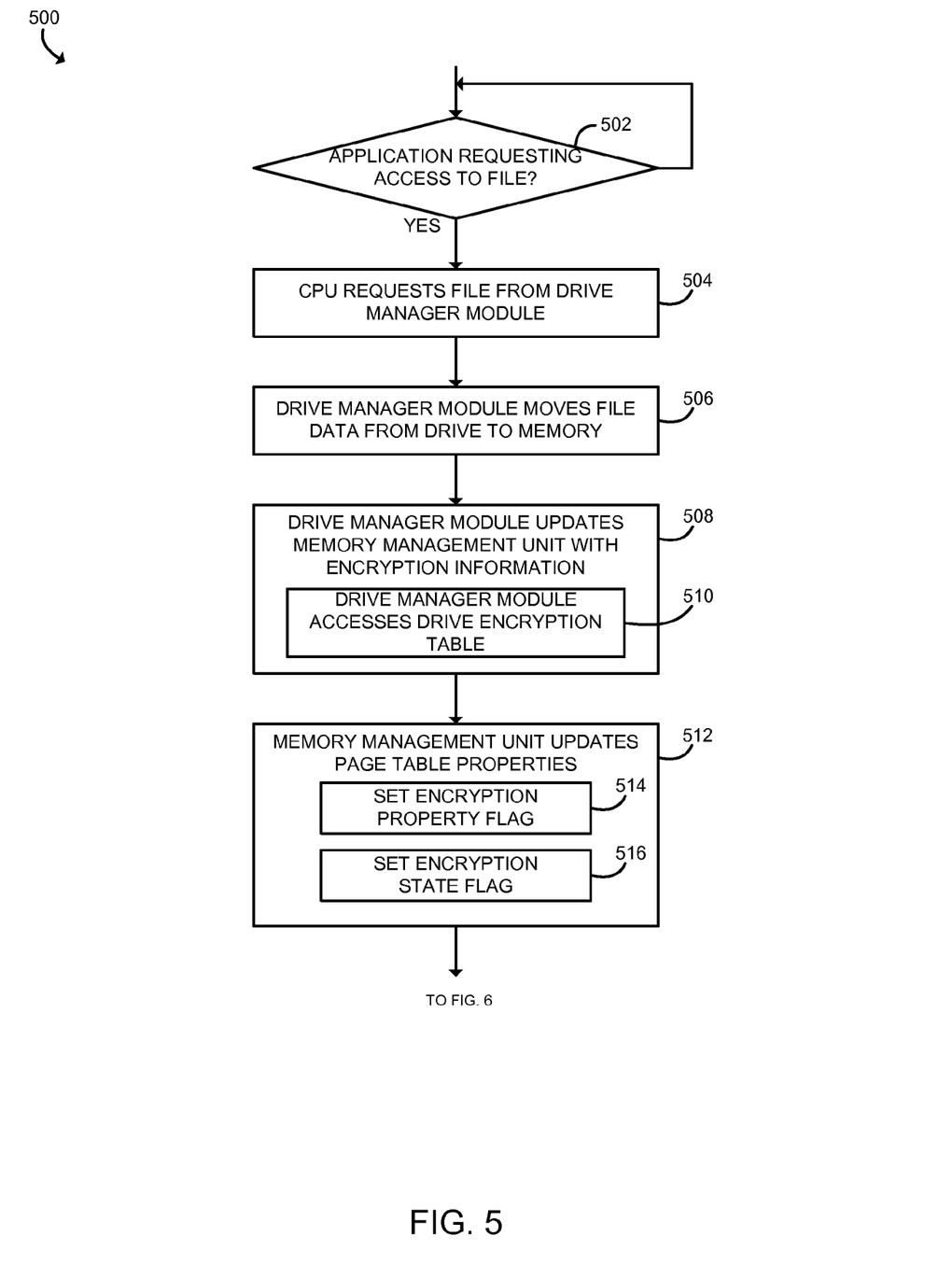
FIGS. 5 and 6 is a simplified flow diagram of a least one embodiment of a method for securing accessing data using processor-based data protection.
Figure 6:
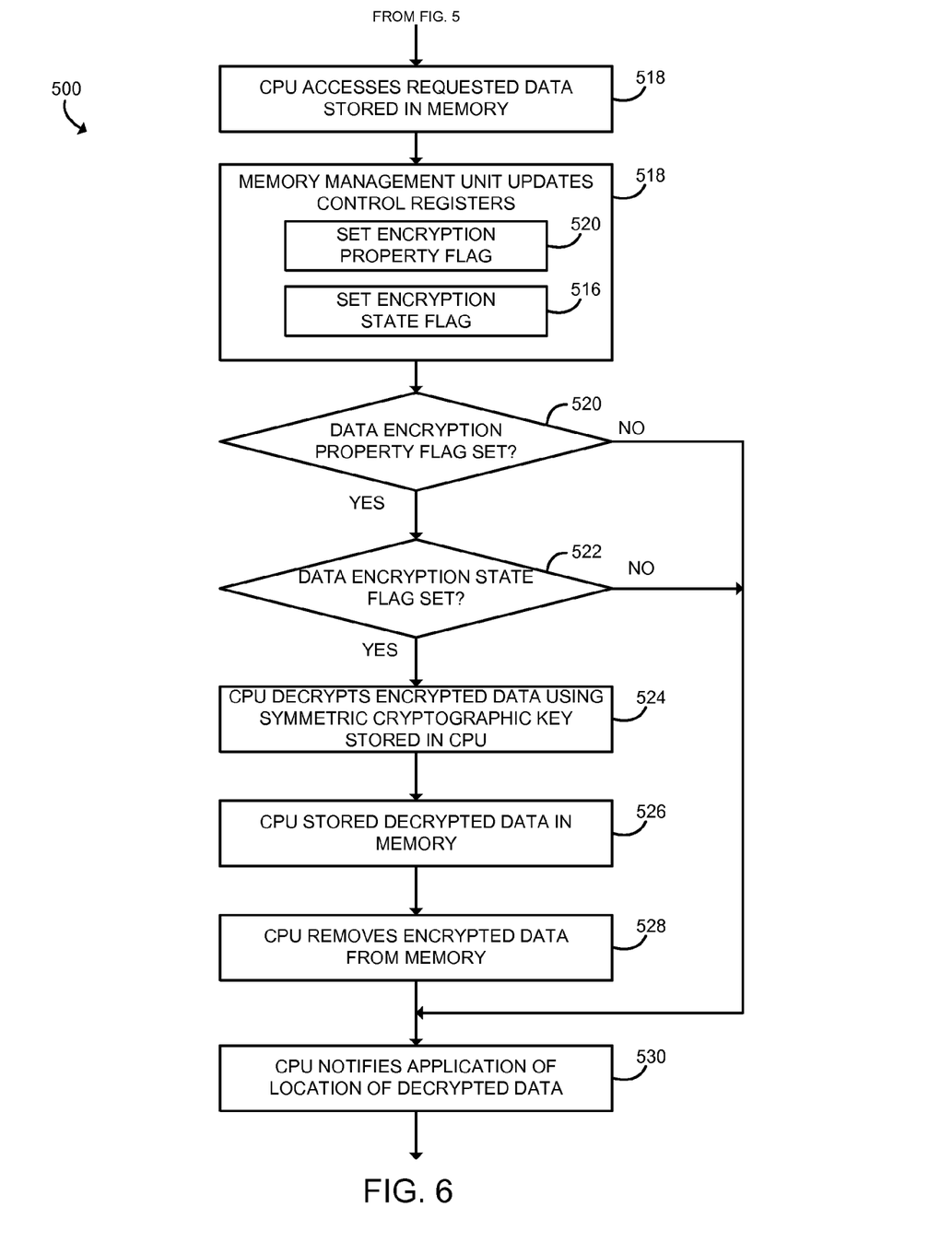

Referring now to FIGS. 5 and 6, when enabled by the security provisioning server 104, the mobile computing device 102 may execute a method 500 for processor-based data protection. The method 500 begins with block 502 in which the central processing unit 110 determines whether an application executing on the mobile computing device 102 is requesting access to a file or data stored on the drive 124. If so, the method 500 advances to block 504 in which the central processing unit 110 requests the file or data from the drive manager module 204. In response, the drive manager module 204 locates the requested data on the drive 124 and moves the data to the memory 122 in block 506. To do so, a drive storage driver 206 may be used to interact with the drive 124 to retrieve the requested data therefrom. Additionally, in block 508, the drive manager module 204 updates the memory management unit 140 with the encryption information related to the requested data. To do so, in block 510, the drive manager module 204 accesses the drive encryption table 210 to determine the encryption status of the data. As discussed above, the drive encryption table 210 illustratively includes an encryption property flag 212 that indicates whether data encryption has been enabled for the requested data (e.g., for the disk block of the drive 124 on which the data is stored) and an encryption state flag 214 that indicates whether the requested data is encrypted or decrypted.

In response to the encryption information received from the drive manager module 204, the memory management unit 140 updates, in block 512, the page table properties 220 for the memory page for the location of the requested data in the memory 122. For example, in the illustrative embodiment, the memory management unit 140 may set the encryption property flag 222 and the encryption state flag 224 of the page table properties 220 in blocks 514, 516 to indicate that data protection for the requested data is enabled and that the requested data is in an encrypted state.

In block 518 (see FIG. 6), the central processing unit 110 access the requested data stored in the memory 122. In response, the memory management unit 140 updates the control registers 230 of the central processing unit 110 with the encryption information for the memory page of the location of the stored requested data in the memory 122. To do so, in the illustrative embodiment, the memory management unit 140 sets the encryption property flag 232 of the control registers 230 in block 520 to indicate that processor-based data protection is enabled for the requested data (or for the associated memory page) and sets the encryption state flag 234 of the control registers 230 in block 522 to indicate the requested data is in an encrypted state. In this way, the central processing unit 110 is capable of discovering the encryption state of data stored in the memory 122 via use of the control registers 230.

In block 520, the central processing unit 110 determines whether the encryption property flag 232 of the control registers 230 has been set to indicate that processor-based data encryption has been enabled for the requested data. If not, the method 500 advances to block 530 in which the central processing unit 110 notifies the application 202 of the location of the requested data, which is stored in a decrypted or unencrypted state. However, if processor-based data protection has been enabled, the method 500 advances to block 522 in which the central processing unit 110 determines whether the encryption state flag 234 of the control registers 230 has been set to indicate that requested data is encrypted. If not, the method advances to block 530 as discussed above. However, if the central processing unit 110 determines that the requested data stored in the memory 122 is encrypted based on the control registers 230, the method 500 advances to block 524 in which the central processing unit 110 decrypts the requested encrypted data. To do so, the cryptographic engine 116 of the central processing unit 110 decrypts the requested encrypted data using the cryptographic symmetric key 134, which was used to previously encrypt the data. In block 526, the central processing unit 110 stores the decrypted data in the memory 122 in a new location and subsequently removes or deletes the encrypted version of the requested data from the memory 122 in block 528. In block 530, the central processing unit notifies the application 202 of the location of the decrypted data in the memory 122. The application 202 may subsequently access, process, and/or manipulate the decrypted data as usual.

Figure 7:
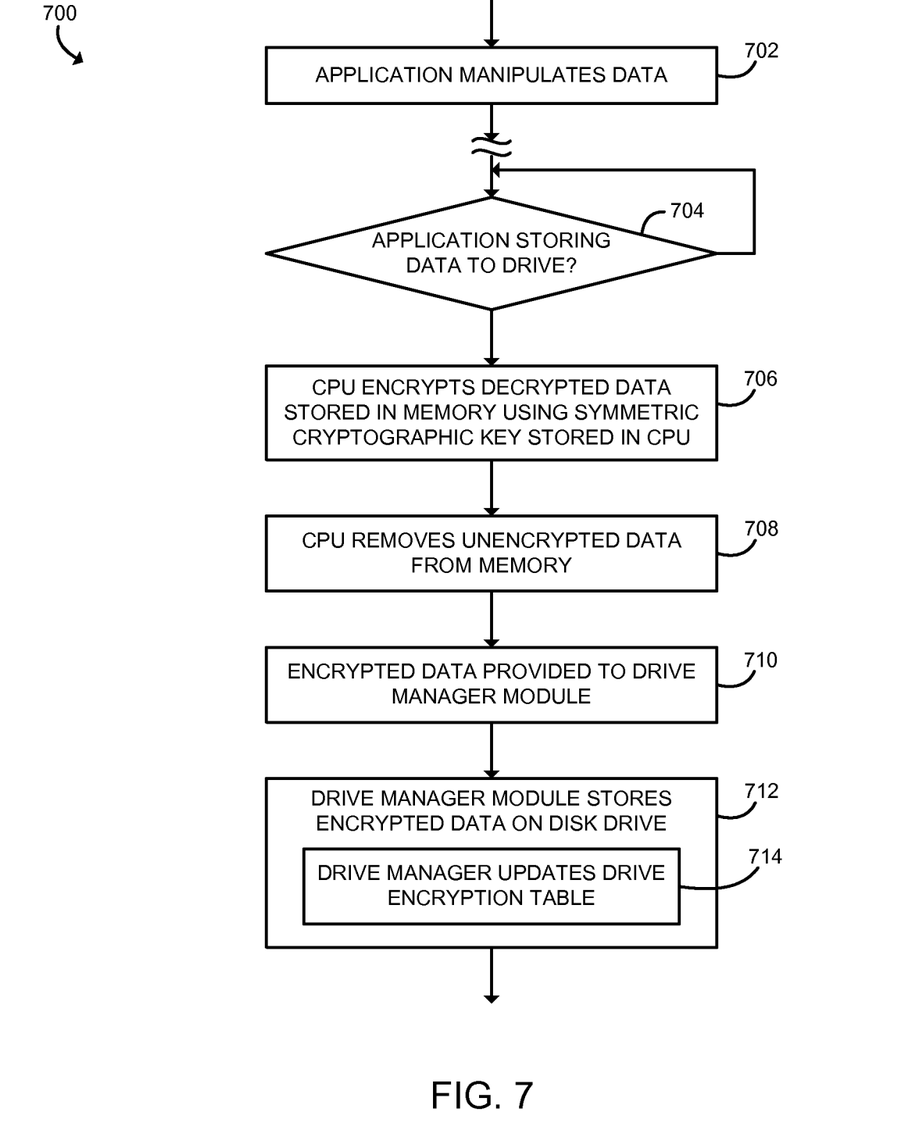
FIG. 7 is a simplified flow diagram of at least one embodiment of a method for securely storing data using processor-based data protection.

Referring now to FIG. 7, the mobile computing device 102 may also execute a method 700 for securely storing data using processor-based data protection. The method 700 begins with block 702 wherein the application 202 may manipulate or generate data to be stored on the mobile computing device 102. In block 704, the central processing unit 110 determines whether the application 202 has requested to store data on the drive 124. If so, the method 700 advances to block 706 in which the central processing unit 110 encrypts the data to be stored. To do so, the cryptographic engine 116 of the central processing unit 110 encrypts the data using the cryptographic symmetric key 134. The encrypted data may be temporarily stored in the memory 122 and, in block 708, the central processing unit 110 may remove the unencrypted data from the memory 122.

In block 710, the encrypted data is provided to the drive manager module 204 for storing on the drive 124. The drive manager module 204 subsequently stores the encrypted data on the drive 124 in block 712. Additionally, in block 714, the drive manager module 204 updates the drive encryption table with the encryption information associated with the encrypted data stored on the drive 124. Such encryption information may be provided to the drive manager module 204 by the memory management unit 140. As discussed above, the drive manager module 204 sets the encryption property flag 212 of the drive encryption table 210 to indicate that processor-based data protection is enabled for the stored data and sets the encryption state flag 214 of the drive encryption table 210 to indicate the stored data is in an encrypted state. In this way, the encryption information of the stored data may be tracked and subsequently used when the stored data is later accessed as discussed above with regard to method 500.

Examples

Illustrative examples of the devices, systems, and methods disclosed herein are provided below. An embodiment of the devices, systems, and methods may include any one or more, and any combination of, the examples described below.

In one example, a mobile computing device for processor-based data protection may include a memory including data stored therein in an encrypted state and a central processing unit including a cryptographic symmetric key stored therein and at least one control register. The central processing unit may (i) access the data stored in the memory, (ii) determine that the accessed data is encrypted based on a state of a flag of the at least one control register of the central processing unit, and (iii) decrypt the accessed data using the cryptographic symmetric key in response to determining that the access data is encrypted.

In an example, the at least one control register may include an encryption property flag that that indicates whether data encryption has been enabled for the accessed data and the central processor is to determine that the accessed data is encrypted by determining the state of the encryption property flag. In an example, the central processing unit may include a control register 4 having the encryption property flag. In an example, the at least one control register may include an encryption state flag that that indicates whether the access data is stored in an encrypted state or a decrypted state and the central processor is to determine that the accessed data is encrypted by determining the state of the encryption state flag. In an example, the central processing unit may include a control register 3 having the encryption state flag.

In an example, the central processing unit may include (i) a first control register having an encryption property flag that that indicates whether data encryption has been enabled for the accessed data and (ii) a second control register having an encryption state flag that that indicates whether the access data is stored in an encrypted state or a decrypted state, and the central processing unit is to determine that the access data is encrypted by determining the state of the encryption property flag and the encryption state flag. In an example, the mobile computing device may further include a drive having data stored thereon and a drive manager module to maintain a drive encryption table that identifies the state of encryption of data stored on the drive. In an example, the mobile computing device may further include a memory management unit to manage the memory. In an example, the drive manager module may receive a request, from the central processing unit, for access to the data stored on the drive, retrieve the requested data from the drive and store the retrieved requested data in the memory, access the drive encryption table to determine whether the requested data is encrypted, and update the memory management unit with the state of encryption of the requested data as a function of the drive encryption table. In an example, the drive manager module is to access the drive encryption table may determine the state of an encryption property flag stored in the drive encryption table that indicates whether data encryption has been enabled for the requested data and determine the state of an encryption state flag stored in the drive encryption able that indicates whether the requested data is stored in an encrypted state or a decrypted state. In an example, the memory management unit may update a memory page properties table associated with a section of the memory in which the requested data is stored with the state of encryption of the requested data stored in memory. In an example, the memory management unit may update the memory page properties table by setting an encryption state flag of the memory page properties table to indicate that the requested data stored in memory is encrypted. In an example, the memory management unit may set an encryption property flag of a first control register of the central processing unit that indicates data encryption has been enabled for the requested data stored in the memory and set an encryption property flag of a second control register of the central processing unit that indicates the requested data is stored in the memory of the mobile computing device in an encrypted state.

In an example, the central processing unit may store the decrypted data in the memory and remove the encrypted data from the memory. In an example, the central processing unit may notify an application executed on the mobile computing device that requested the data of the location of the decrypted data in memory. In an example, the mobile computing device may further include a drive having data stored thereon and the central processing unit may receive a request from an application executed on the mobile computing device to store unencrypted data to the drive and encrypt, in response to the request from the application, the unencrypted data using the cryptographic symmetric key stored in the central processing unit. In an example, the central processing unit may further remove the unencrypted data from the memory of the mobile computing device after the unencrypted data has been encrypted by the central processing unit. In an example, the mobile computing device may further include a drive manager module to maintain a drive encryption table that identifies the state of encryption of data stored on the drive. The drive manager module may update the drive encryption table to indicate that the encrypted data is stored on the drive in an encrypted state.

In an example, the central processing unit further include a cryptographic processor key that was provisioned in the central processing unit during manufacturing of the central processing unit. In such example, the mobile computing device may further include a security engine to establish a secure communication link with a security server and establish a shared secret with the security server using the cryptographic processor key. In an example, the cryptographic processor key is a one-time-programmable fuse located within the central processing unit. In an example, the security engine may receive a command from the security server over the secure communication link to perform data encryption on the mobile computing device, and the central processing unit may generate, in response to the command received from the security server, the cryptographic symmetric key as a function of the shared secret. In an example, the mobile computing device may further include a drive having data stored thereon and the central processing unit may encrypt, in response to the command received from the security server, data stored on the drive using the cryptographic symmetric key.

In an example, a method for processor-based data protection on a mobile computing device may include accessing, with a central processing unit of the mobile computing device, data stored in a memory of the mobile computing device; determining, with the central processing unit, that the accessed data is encrypted based on a state of a flag of at least one control register of the central processing unit; and decrypting, in response to determining that the accessed data is encrypted, the accessed data using a cryptographic symmetric key stored in the central processing unit. In an example, determining that the accessed data is encrypted may include determining the state of an encryption property flag of a control register of the central processing unit that indicates whether data encryption has been enabled for the accessed data. In an example, determining the state of the encryption property flag may include determining the state of an encryption property flag of control register 4 of the central processing unit. In an example, determining that the accessed data is encrypted may include determining the state of an encryption state flag of a control register of the central processing unit that indicates whether the access data is stored in an encrypted state or a decrypted state. In an example, determining the state of the encryption state flag may include determining the state of an encryption state flag of control register 3 of the central processing unit.

In an example, determining that the accessed data is encrypted may include determining the state of an encryption property flag of a first control register of the central processing unit, wherein the encryption property flag indicates whether data encryption has been enabled for the accessed data; and determining the state of an encryption state flag of second control register of the central processing unit different from the first control register, wherein the encryption state flag indicates whether the access data is stored in an encrypted state or a decrypted state. In an example, the method may further include receiving a request for access to data stored on a drive of the mobile computing device, moving the requested data from the drive to the memory of the mobile computing device, accessing a drive encryption table that identifies the state of encryption of data stored on the drive to determine whether the requested data is encrypted, and updating a memory management unit of the mobile computing device with the state of encryption of the requested data as a function of the drive encryption table. In an example, accessing the drive encryption table may include determining the state of an encryption property flag stored in the drive encryption table that indicates whether data encryption has been enabled for the requested data and determining the state of an encryption state flag stored in the drive encryption able that indicates whether the requested data is stored in an encrypted state or a decrypted state.

In an example, the method may further include updating a memory page properties table associated with a section of the memory of the mobile computing device in which the requested data is stored with the state of encryption of the requested data stored in memory. In an example, updating the memory page table may include setting an encryption state flag of the memory page properties table to indicate that the requested data stored in memory is encrypted. In an example, the method may further include setting an encryption property flag of a control register of the central processing unit that indicates data encryption has been enabled for the requested data stored in the memory and setting an encryption property flag of a control register of the central processing unit that indicates the requested data is stored in the memory of the mobile computing device in an encrypted state.

In an example, the method may further include storing the decrypted data in the memory of the mobile computing device and removing the encrypted data from the memory. In an example, the method may further include notifying an application executed on the mobile computing device that requested the data of the location of the decrypted data in memory. In an example, the method may further include receiving a request from an application executed on the mobile computing device to store unencrypted data to a drive of the mobile computing device, encrypting, in response to the request from the application, the unencrypted data using the cryptographic symmetric key stored in the central processing unit, and storing the encrypted data to a drive of the mobile computing device. In an example, the method may further include removing the unencrypted data from the memory of the mobile computing device after the unencrypted data has been encrypted by the central processing unit. In an example, the method may further include updating a drive encryption table that identifies the state of encryption of data stored on the drive with information to indicate that the encrypted data is stored on the drive in an encrypted state.

In an example, the method may further include establishing a secure communication link between the mobile computing device and a security server and establishing a shared secret with the security server using a cryptographic processor key that was provisioned in the central processing unit during manufacturing of the central processing unit. In an example, the method may further include receiving a command from the security server over the secure communication link to perform data encryption on the mobile computing device; and generating, in response to the command received from the security server, the cryptographic symmetric key as a function of the shared secret. In an example, the method may further include encrypting, in response to the command received from the security server, data stored on a drive of the mobile computing device using the cryptographic symmetric key.

In another example, a mobile computing device may include a central processing unit and a memory having stored therein a plurality of instructions that when executed by the processor cause the mobile computing device to perform any of the methods described above. In yet another example, one or more machine readable media comprising a plurality of instructions stored thereon that in response to being executed result in a mobile computing device performing the any of the methods described above.

In another example, at least one computer-readable storage medium may include a plurality of instructions that in response to being executed result in a mobile computing device accessing, with a central processing unit of the mobile computing device, data stored in a memory of the mobile computing device; determining the state of an encryption property flag of a first control register of the central processing unit, wherein the encryption property flag indicates whether data encryption has been enabled for the accessed data; determining the state of an encryption state flag of a second control register of the central processing unit, wherein the encryption state flag indicates whether the access data is stored in an encrypted state or a decrypted state; determining that the accessed data is encrypted based on the state of the encryption property flags of the control registers of the central processing unit; and decrypting, in response to determining that the accessed data is encrypted, the accessed data using a cryptographic symmetric key stored in the central processing unit. In an example, the plurality of instructions may further result in the mobile computing device receiving a request for access to data stored on a drive of the mobile computing device, moving the requested data from the drive to the memory of the mobile computing device, accessing a drive encryption table stored on the mobile computing device that identifies the state of encryption of data stored on the drive to determine whether the requested data is encrypted, and updating a memory management unit of the mobile computing device with the state of encryption of the requested data as a function of the drive encryption table.

In an example, accessing the drive encryption table may include determining the state of an encryption property flag stored in the drive encryption table that indicates whether data encryption has been enabled for the requested data and determining the state of an encryption state flag stored in the drive encryption able that indicates whether the requested data is stored in an encrypted state or a decrypted state. In an example, the plurality of instructions may further result in the mobile computing device updating a memory page properties table associated with a section of the memory of the mobile computing device in which the requested data is stored with the state of encryption of the requested data stored in memory. In an example, updating the memory page table may include setting an encryption state flag of the memory page properties table to indicate that the requested data stored in memory is encrypted. In an example, the plurality of instructions further result in the mobile computing device setting an encryption property flag of a control register of the central processing unit that indicates data encryption has been enabled for the requested data stored in the memory and setting an encryption property flag of a control register of the central processing unit that indicates the requested data is stored in the memory of the mobile computing device in an encrypted state.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

The invention claimed is:

1. A mobile computing device for processor-based data protection, the mobile computing device comprising:
a memory device including data stored therein in an encrypted state, wherein the data is associated with an encryption property flag that is set; and
a central processing unit including a cryptographic symmetric key stored therein and at least one control register, wherein the memory device is separate from the central processing unit, the central processing unit to:
(i) receive a secure command from a security server;
(ii) decrypt the secure command;
(iii) determine whether the secure command is a command to enable decryption by the central processing unit,
(iv) enable, in response to a determination that the secure command is a command to enable decryption, decryption by the central processing unit using the cryptographic symmetric key stored therein,
(v) access the data stored in the memory device,
(vi) determine that the data accessed in the memory device is encrypted based on a state of a control bit of the at least one control register of the central processing unit,
(vii) decrypt the data accessed in the memory device using the cryptographic symmetric key in response to determining that the data accessed in the memory device is encrypted, and
(viii) store the decrypted data in the memory device with the associated encryption property flag set.

2. The mobile computing device of claim 1, wherein the at least one control register includes an encryption state control bit that indicates whether the access data is stored in an encrypted state or a decrypted state and the central processor is to determine that the data accessed in the memory device is encrypted by determining the state of the encryption state control bit.

3. The mobile computing device of claim 1, wherein central processing unit includes (i) a first control register having an encryption property control bit that indicates whether data encryption has been enabled for the data accessed in the memory device and (ii) a second control register having an encryption state control bit that that indicates whether the data accessed in the memory device is stored in an encrypted state or a decrypted state, and
wherein the central processing unit is to determine that the access data is encrypted by determining the state of the encryption property control bit and the encryption state control bit.

4. The mobile computing device of claim 1, further comprising:
a drive having data stored thereon; and
a drive manager module to maintain a drive encryption table that identifies the state of encryption of data stored on the drive.

5. The mobile computing device of claim 4, further comprising a memory management unit to manage the memory device, wherein the drive manager module is to:
receive a request, from the central processing unit, for access to the data stored on the drive,
retrieve the requested data from the drive and store the retrieved requested data in the memory device,
access the drive encryption table to determine whether the requested data is encrypted, and
update the memory management unit with the state of encryption of the requested data as a function of the drive encryption table.

6. The mobile computing device of claim 5 wherein the drive manager module is to access the drive encryption table to:
determine the state of an encryption property control bit stored in the drive encryption table that indicates whether data encryption has been enabled for the requested data, and determine the state of an encryption state control bit stored in the drive encryption table that indicates whether the requested data is stored in an encrypted state or a decrypted state.

7. The mobile computing device of claim 5, wherein the memory management unit is to update a memory page properties table associated with a section of the memory device in which the requested data is stored with the state of encryption of the requested data stored in the memory device.

8. The mobile computing device of claim 7, wherein the memory management unit is to:
set an encryption property control bit of a first control register of the central processing unit that indicates data encryption has been enabled for the requested data stored in the memory device; and
set an encryption property control bit of a second control register of the central processing unit that indicates the requested data is stored in the memory device of the mobile computing device in an encrypted state.

9. The mobile computing device of claim 1, the central processing unit further to:
receive a second secure command from the security server;
decrypt the second secure command;
determine whether the second secure command is a command to disable decryption by the central processing unit, and
disable, in response to the second secure command, decryption by the central processing unit.

10. A method for processor-based data protection on a mobile computing device, the method comprising:
receiving, with a central processing unit of the mobile computing device, a secure command from a security server;
decrypting the secure command;
determining whether the secure command is a command to enable decryption;
enabling, in response to a determination that the secure command is a command to enable decryption, decryption by the central processing unit using a cryptographic symmetric key stored in the central processing unit;
accessing, with the central processing unit of the mobile computing device, data stored in a memory device of the mobile computing device, wherein the memory device is separate from the central processing unit and wherein the data is associated with an encryption property flag that is set;
determining, with the central processing unit, that the data accessed in the memory device is encrypted based on a state of a control bit of at least one control register of the central processing unit;
decrypting, in response to determining that the data accessed in the memory device is encrypted, the data accessed in the memory device using the cryptographic symmetric key stored in the central processing unit; and
storing the decrypted data in the memory device with the associated encryption property flag set.

11. The method of claim 10, determining that the data accessed in the memory device is encrypted comprises determining the state of an encryption state control bit of a control register of the central processing unit that indicates whether the data accessed in the memory device is stored in an encrypted state or a decrypted state.

12. The method of claim 10, wherein determining that the data accessed in the memory device is encrypted comprises:
determining the state of an encryption property control bit of a first control register of the central processing unit, wherein the encryption property control bit indicates whether data encryption has been enabled for the data accessed in the memory device; and
determining the state of an encryption state control bit of second control register of the central processing unit different from the first control register, wherein the encryption state control bit indicates whether the access data is stored in an encrypted state or a decrypted state.

13. The method of claim 10, further comprising:
receiving a request for access to data stored on a drive of the mobile computing device;
moving the requested data from the drive to the memory device of the mobile computing device;
accessing a drive encryption table that identifies the state of encryption of data stored on the drive to determine whether the requested data is encrypted; and
updating a memory management unit of the mobile computing device with the state of encryption of the requested data as a function of the drive encryption table.

14. The method of claim 13, wherein accessing the drive encryption table comprises:
determining the state of an encryption property control bit stored in the drive encryption table that indicates whether data encryption has been enabled for the requested data; and
determining the state of an encryption state control bit stored in the drive encryption able that indicates whether the requested data is stored in an encrypted state or a decrypted state.

15. The method of claim 13, further comprising updating a memory page properties table associated with a section of the memory device of the mobile computing device in which the requested data is stored with the state of encryption of the requested data stored in the memory device.

16. The method of claim 15, further comprising:
setting an encryption property control bit of a control register of the central processing unit that indicates data encryption has been enabled for the requested data stored in the memory device; and
setting an encryption property control bit of a control register of the central processing unit that indicates the requested data is stored in the memory device of the mobile computing device in an encrypted state.

17. The method of claim 10, further comprising:
storing the decrypted data in the memory device of the mobile computing device; and
removing the encrypted data from the memory device.

18. At least one non-transitory computer-readable storage medium comprising a plurality of instructions that in response to being executed result in a mobile computing device:
receiving, with a central processing unit of the mobile computing device, a secure command from a security server;
decrypting the secure command;
determining whether the secure command is a command to enable decryption;
enabling, in response to a determination that the secure command is a command to enable decryption, decryption by the central processing unit using a cryptographic symmetric key stored in the central processing unit;
accessing, with the central processing unit of the mobile computing device, data stored in a memory device of the mobile computing device, wherein the memory device is separate from the central processing unit and wherein the data is associated with an encryption property flag that is set;

determining the state of an encryption property control bit of a first control register of the central processing unit, wherein the encryption property control bit indicates whether data encryption has been enabled for the data accessed in the memory device;

determining the state of an encryption state control bit of a second control register of the central processing unit, wherein the encryption state control bit indicates whether the data accessed in the memory device is stored in an encrypted state or a decrypted state;

determining that the data accessed in the memory device is encrypted based on the state of the encryption property control bits of the control registers of the central processing unit;

decrypting, in response to determining that the data accessed in the memory device is encrypted, the data accessed in the memory device using the cryptographic symmetric key stored in the central processing unit, and storing the decrypted data in the memory device.

19. The at least one computer-readable storage medium of claim 18, wherein the plurality of instructions further result in the mobile computing device:

receiving a request for access to data stored on a drive of the mobile computing device;

moving the requested data from the drive to the memory device of the mobile computing device;

accessing a drive encryption table stored on the mobile computing device that identifies the state of encryption of data stored on the drive to determine whether the requested data is encrypted; and updating a memory management unit of the mobile computing device with the state of encryption of the requested data as a function of the drive encryption table.

20. The at least one computer-readable storage medium of claim 19, wherein accessing the drive encryption table comprises:

determining the state of an encryption property control bit stored in the drive encryption table that indicates whether data encryption has been enabled for the requested data; and determining the state of an encryption state control bit stored in the drive encryption table that indicates whether the requested data is stored in an encrypted state or a decrypted state.

21. The at least one computer-readable storage medium of claim 19, wherein the plurality of instructions further result in the mobile computing device updating a memory page properties table associated with a section of the memory device of the mobile computing device in which the requested data is stored with the state of encryption of the requested data stored in the memory device.

22. The at least one computer-readable storage medium of claim 21, wherein updating the memory page table comprises setting an encryption state control bit of the memory page properties table to indicate that the requested data stored in the memory device is encrypted.

23. The at least one computer-readable storage medium of claim 21, wherein the plurality of instructions further result in the mobile computing device:

setting an encryption property control bit of a control register of the central processing unit that indicates data encryption has been enabled for the requested data stored in the memory device; and setting an encryption property control bit of a control register of the central processing unit that indicates the requested data is stored in the memory device of the mobile computing device in an encrypted state.

* * * * *

UNITED STATES PATENT AND TRADEMARK OFFICE
CERTIFICATE OF CORRECTION

PATENT NO. : 9,569,633 B2
APPLICATION NO. : 13/538142
DATED : February 14, 2017
INVENTOR(S) : Gyan Prakash et al.

Page 1 of 1

It is certified that error appears in the above-identified patent and that said Letters Patent is hereby corrected as shown below:

On the Title Page

Under the (*), remove "This patent is subject to a terminal disclaimer."

Signed and Sealed this
Nineteenth Day of May, 2020

Andrei Iancu
*Director of the United States Patent and Trademark Office*